United States Patent
Ogawa et al.

(10) Patent No.: US 9,714,697 B2
(45) Date of Patent: Jul. 25, 2017

(54) STEPLESS TRANSMISSION (71) Applicants: Hiroyuki Ogawa, Susono (JP); Akira Hibino, Susono (JP); Yuki Aratsu, Susono (JP)

(72) Inventors: Hiroyuki Ogawa, Susono (JP); Akira Hibino, Susono (JP); Yuki Aratsu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 217 days.

(21) Appl. No.: 14/438,491

(22) PCT Filed: Sep. 30, 2013

(86) PCT No.: PCT/JP2013/076594
§ 371 (c)(1),
(2) Date: Apr. 24, 2015

(87) PCT Pub. No.: WO2014/069141
PCT Pub. Date: May 8, 2014

(65) Prior Publication Data
US 2015/0285345 A1 Oct. 8, 2015

(30) Foreign Application Priority Data
Nov. 5, 2012 (JP) .................................. 2012-243848

(51) Int. Cl.
*F16H 13/08* (2006.01)
*F16H 15/38* (2006.01)
(Continued)

(52) U.S. Cl.
CPC ............. *F16H 15/52* (2013.01); *F16H 57/08* (2013.01); *F16H 2055/325* (2013.01)

(58) Field of Classification Search
CPC .................................. F16H 13/08; F16H 15/38
See application file for complete search history.

(56) References Cited

U.S. PATENT DOCUMENTS 4,324,441 A * 4/1982 Rouverol ................ F16C 33/30
384/492
4,713,976 A * 12/1987 Wilkes .................... F16H 48/12
476/21
(Continued)

FOREIGN PATENT DOCUMENTS

JP      2004-044686 A      2/2004
JP      2005-180498 A      7/2005
(Continued)

OTHER PUBLICATIONS

International Search Report issued Jan. 14, 2014 in PCT/JP2013/076594 filed Sep. 30, 2013.
(Continued)

*Primary Examiner* — Tisha Lewis
(74) *Attorney, Agent, or Firm* — Oblon, McClelland, Maier & Neustadt, L.L.P.

(57) ABSTRACT

A stepless transmission includes: a transmission shaft; first to fourth power transmission elements; a plurality of rolling bodies clamped by the first and second power transmission elements disposed in confrontation with each other, and tiltably held by the fourth power transmission element; an axial force generator configured to generate axial force in an axial direction for pressing at least one of the first and second power transmission elements against the rolling bodies; and a transmission device configured to change a gear ratio between an input and output by tilting the rolling bodies. Young's moduli of a contact section and an additional contact section, in contact with the rolling body, of one of the first and second power transmission elements are larger than those of other one of the first and second power transmission elements.

12 Claims, 7 Drawing Sheets (51) Int. Cl.
  *F16H 15/52* (2006.01)
  *F16H 57/08* (2006.01)
  *F16H 55/32* (2006.01)

(56) References Cited

U.S. PATENT DOCUMENTS

| | | | |
|---|---|---|---|
| 2004/0102285 A1* | 5/2004 | Kato | F16H 15/38 |
| | | | 476/46 |
| 2004/0171452 A1 | 9/2004 | Miller et al. | |
| 2004/0224808 A1 | 11/2004 | Miller et al. | |
| 2005/0113202 A1 | 5/2005 | Miller et al. | |
| 2005/0117983 A1 | 6/2005 | Miller et al. | |
| 2005/0119086 A1 | 6/2005 | Miller et al. | |
| 2005/0119087 A1 | 6/2005 | Miller et al. | |
| 2005/0119090 A1 | 6/2005 | Miller et al. | |
| 2005/0124456 A1 | 6/2005 | Miller et al. | |
| 2005/0130784 A1 | 6/2005 | Miller et al. | |
| 2005/0137046 A1 | 6/2005 | Miller et al. | |
| 2005/0137051 A1 | 6/2005 | Miller et al. | |
| 2005/0137052 A1 | 6/2005 | Miller et al. | |
| 2005/0148422 A1 | 7/2005 | Miller et al. | |
| 2005/0148423 A1 | 7/2005 | Miller et al. | |
| 2005/0153808 A1 | 7/2005 | Miller et al. | |
| 2005/0153809 A1 | 7/2005 | Miller et al. | |
| 2005/0153810 A1 | 7/2005 | Miller et al. | |
| 2005/0159265 A1 | 7/2005 | Miller et al. | |
| 2005/0159266 A1 | 7/2005 | Miller et al. | |
| 2005/0159267 A1 | 7/2005 | Miller et al. | |
| 2005/0164819 A1 | 7/2005 | Miller et al. | |
| 2005/0170927 A1 | 8/2005 | Miller et al. | |
| 2005/0176544 A1 | 8/2005 | Miller et al. | |
| 2005/0176545 A1 | 8/2005 | Miller et al. | |
| 2005/0178893 A1 | 8/2005 | Miller et al. | |
| 2005/0255957 A1 | 11/2005 | Miller et al. | |
| 2007/0270265 A1 | 11/2007 | Miller et al. | |
| 2007/0270266 A1 | 11/2007 | Miller et al. | |
| 2007/0270267 A1 | 11/2007 | Miller et al. | |
| 2007/0270268 A1 | 11/2007 | Miller et al. | |
| 2007/0270269 A1 | 11/2007 | Miller et al. | |
| 2007/0270270 A1 | 11/2007 | Miller et al. | |
| 2007/0270271 A1 | 11/2007 | Miller et al. | |
| 2007/0270272 A1 | 11/2007 | Miller et al. | |
| 2007/0270278 A1 | 11/2007 | Miller et al. | |
| 2007/0275809 A1 | 11/2007 | Miller et al. | |
| 2007/0281819 A1 | 12/2007 | Miller et al. | |
| 2007/0287579 A1 | 12/2007 | Miller et al. | |
| 2008/0009386 A1 | 1/2008 | Harada et al. | |
| 2008/0121487 A1 | 5/2008 | Miller et al. | |
| 2008/0125281 A1 | 5/2008 | Miller et al. | |
| 2008/0125282 A1 | 5/2008 | Miller et al. | |
| 2008/0132373 A1 | 6/2008 | Miller et al. | |
| 2008/0132377 A1 | 6/2008 | Miller et al. | |
| 2008/0276756 A1 | 11/2008 | Marumoto | |
| 2009/0003880 A1 | 1/2009 | Marumoto | |
| 2009/0124447 A1 | 5/2009 | Marumoto | |
| 2009/0131212 A1 | 5/2009 | Marumoto et al. | |
| 2012/0035016 A1 | 2/2012 | Miller et al. | |
| 2012/0309579 A1 | 12/2012 | Miller et al. | |
| 2013/0281256 A1 | 10/2013 | Miller et al. | |
| 2014/0128195 A1 | 5/2014 | Miller et al. | |
| 2014/0141932 A1* | 5/2014 | Takashima | C23C 4/06 |
| | | | 476/8 |

FOREIGN PATENT DOCUMENTS

| | | |
|---|---|---|
| JP | 2009-138924 A | 6/2009 |
| JP | 2010-101496 A | 5/2010 |

OTHER PUBLICATIONS

Office Action issued Feb. 3, 2015 in Japanese Patent Application No. 2012-243848 filed Nov. 5, 2012 (with English language translation).

* cited by examiner

STEPLESS TRANSMISSION

FIELD

The invention relates to a traction drive type stepless transmission that includes plural power transmission elements having a common rotation center axis and plural rolling bodies disposed radially to the rotation center axis and steplessly changes a gear ratio between an input and an output by tilting rolling bodies clamped by two of the power transmission elements.

BACKGROUND

Conventionally, as this type of the stepless transmissions, a ball planetary type stepless transmission has been known that includes a transmission shaft acting as a center of rotation, plural power transmission elements capable of relatively rotating using the center axis of the transmission shaft as a center of rotation axis, and rolling bodies radially disposed to the center of rotation axis and clamped by three of the power transmission elements. In the ball planetary type stepless transmission, the rolling bodies are clamped by a first power transmission element and a second power transmission element disposed in confrontation with each other and the rolling bodies are disposed on the outer circumferential surface of a third power transmission element. In the stepless transmission, force (axial force) in the axial direction is applied to the rolling bodies from at least one of the first and second power transmission elements to thereby generate traction force (tangential force) between contact sections. Further, in the stepless transmission, a gear ratio is changed by tilting the rolling bodies. Patent Literature 1 described below discloses the ball planetary type stepless transmission. In the stepless transmission of Patent Literature 1 described below, coating is applied to the first to third power transmission elements and to the rolling bodies to increase the friction coefficient thereof so that durability is improved by the reduction of axial force resulting from the increase of the friction coefficient. Note that Patent Literature 2 described below discloses a toroidal type stepless transmission the durability of an output disk of which is improved by applying a surface treatment such as a carbonizing treatment, etc.

CITATION LIST

Patent Literatures

Patent Literature 1: Japanese Laid-open Patent Publication No. 2010-101496
Patent Literature 2: Japanese Laid-open Patent Publication No. 2005-180498

SUMMARY

Technical Problem

However, in the stepless transmission of Patent Literature 1, since the coating is applied to all the members having a contact section, cost is increased.

Thus, an object of the invention is to provide a stepless transmission that can improve the disadvantage of the conventional examples and can improve durability while suppressing an increase of cost.

Solution to Problem

To achieve the above-described object, the present invention includes a transmission shaft acting as a center of rotation; first to fourth power transmission elements having a first rotation center axis concentrically with the transmission shaft and capable of relatively rotating in a circumferential direction mutually; a plurality of rolling bodies having a second rotation center axis, disposed radially about the first rotation center axis on an outer circumferential surface of the third power transmission element, clamped by the first and second power transmission elements disposed in confrontation with each other, and tiltably held by the fourth power transmission element; an axial force generator configured to generate axial force in an axial direction for pressing at least one of the first and second power transmission elements against the rolling bodies; and a transmission device configured to change a gear ratio between an input and output by tilting the rolling bodies, and Young's moduli of a contact section and an additional contact section, in contact with the rolling body, of one of the first and second power transmission elements are larger than Young's moduli of a contact section and an additional contact section, in contact with the rolling body, of other one of the first and second power transmission elements.

It is preferable that Young' modulus of a material or a surface treatment of at least the contact section and the additional contact section of the one of the power transmission elements is larger than the Young' modulus of the contact section and the additional contact section of the other one of the power transmission elements.

Moreover, it is preferable that the one of the power transmission elements comprises at least two members, and Young's modulus of one member including the contact section and the additional contact section is larger than Young's modulus of another member.

Moreover, it is preferable that the one of the power transmission elements is coupled with a power input shaft and the other one of the power transmission elements is coupled with a power output shaft.

Moreover, it is preferable that Young's moduli of a contact section and an additional contact section, in contact with the one of the power transmission elements, of the rolling bodies are larger than Young's moduli of a contact section and an additional contact section in contact with the other one of the power transmission elements, and the Young's moduli of the contact section and the additional contact section in contact with the one of the power transmission elements become larger as a radius of a ring formed by the contact section and the additional contact section becomes smaller.

Moreover, it is preferable that Young's modulus of at least a material or surface treatment of the contact section and the additional contact section, in contact with the one of the power transmission elements, of the rolling bodies are larger than the Young's moduli of the contact section and the additional contact section in contact with the other one of the power transmission elements, and the Young's modulus of a material or surface treatment of the contact section and the additional contact section in contact with the one of the power transmission elements become larger as the radius of a ring formed by the contact section and the additional contact section becomes smaller.

Advantageous Effects of Invention

Since, in the stepless transmission according to the invention, the Young's moduli of the contact section and the additional contact section in contact with each rolling body in one of the first and second power transmission elements are made larger than the Young's moduli of the contact section and the additional contact section in contact with each rolling body in the other of the first and second power transmission elements, the stepless transmission can make the area of the contact ellipse of the contact section in the power transmission element on one hand smaller than the area of the contact ellipse of the contact section in the power transmission element on the other hand and can make the contact pressure of the contact ellipse of the contact section in the power transmission element on the one hand higher than the contact pressure of the contact ellipse of the contact section in the power transmission element on the other hand. Because of this, in the contact section according to the power transmission element on the one hand, even if the axial force of the axial force generator is reduced in comparison with the conventional modes in which the Young's moduli of the contact section and the additional contact section in the power transmission element on the one hand are made the same magnitude as the magnitude of the Young' moduli of the contact section, etc. of the power transmission element on the other hand, the contact pressure of the contact ellipse necessary to generate the target value of the traction force can be secured. Further, in the contact section according to the power transmission element on the one hand, it is possible to reduce the spin loss due to the reduction of the area of the contact ellipse while securing the contact pressure of the contact ellipse in comparison with the conventional modes. In addition, in the contact section according to the power transmission element on the other hand, the contact pressure of the contact ellipse which may become excessive can be reduced by reducing the axial forces of the axial force generators in comparison with the conventional modes. Thus, in the contact section according to the power transmission element on the other hand, it is possible to improve the durability of the other power transmission element and the rolling bodies while generating the target value of traction force in comparison with the conventional modes. Accordingly, the stepless transmission can improve the durability while suppressing an increase of cost and securing a performance as a traction drive.

DESCRIPTION OF EMBODIMENTS

An embodiment of a stepless transmission according to the invention will be explained below in detail based on the drawings. Note that the invention is not restricted by the embodiment.

Embodiment

An embodiment of a stepless transmission according to the invention will be explained below in detail based on FIG. 1 to FIG. 5.

Figure 1:
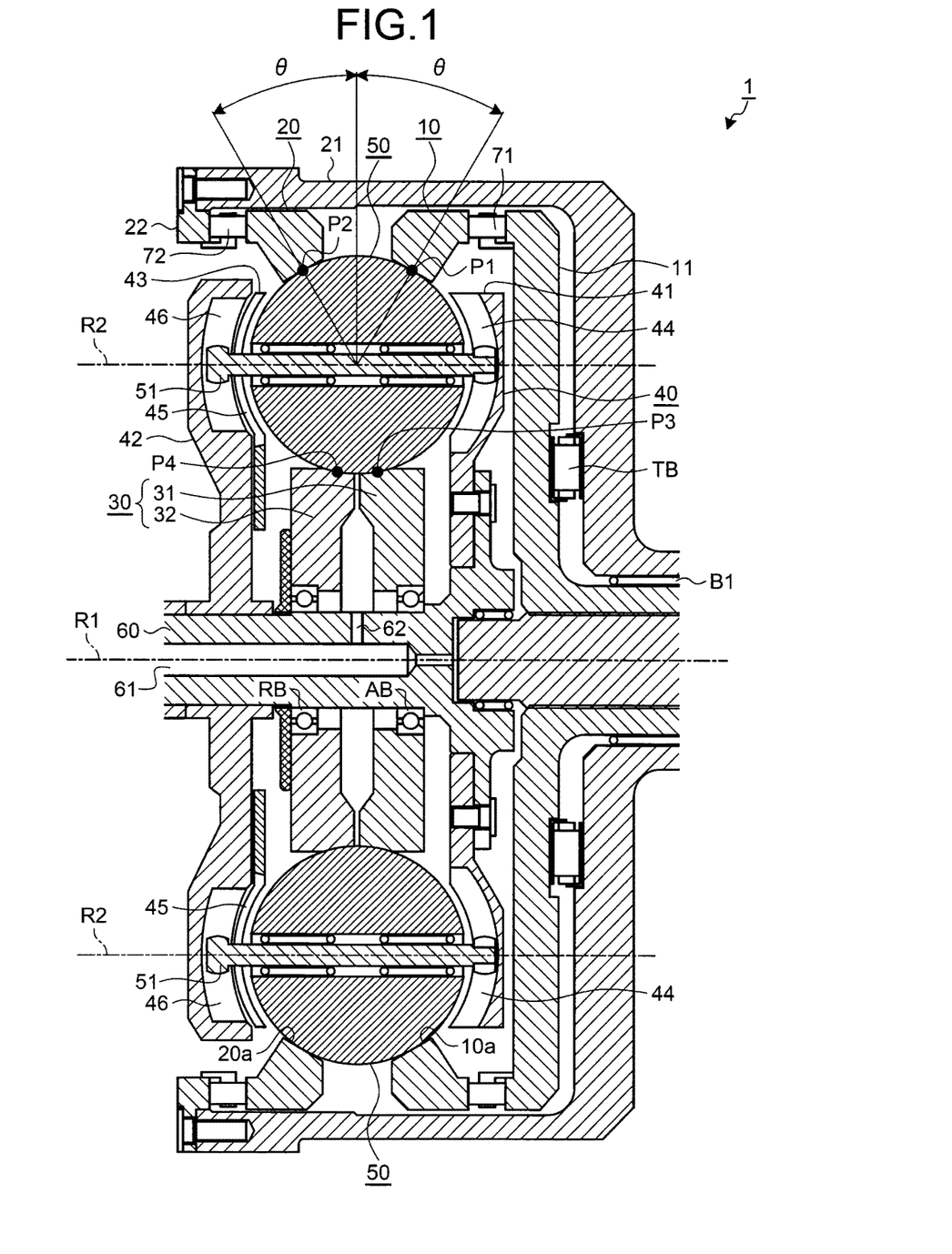
FIG. 1 is a sectional view illustrating an example of a configuration of a stepless transmission according to the invention.

First, an example of a traction drive type stepless transmission of the embodiment will be explained using FIG. 1. The stepless transmission includes a ball planetary type stepless transmission mechanism corresponding to a traction planetary mechanism. Reference numeral 1 of FIG. 1 illustrates an example of the ball planetary type stepless transmission in the embodiment.

The stepless transmission mechanism of the embodiment includes four power transmission elements having a common first rotation center axis R1, plural rolling bodies radially disposed about the first rotation center axis R1, and a transmission shaft disposed to the center of rotation of the four power transmission elements. The rolling bodies have a second rotation center axis R2 different from the first rotation center axis R1 and can carry out a tilt operation on a tilt surface including the second rotation center axis R2 thereof and the first rotation center axis R1. In the following description, unless particularly described otherwise, the direction along the first rotation center axis R1 is called an axial direction and a direction around the first rotation center axis R1 is called a circumferential direction. Further, the direction orthogonal to the first rotation center axis R1 is called a radial direction and, in particular, a side of the direction facing inside is called a radial direction inside and a side thereof facing outside is called a radial direction outside.

In the stepless transmission mechanism, the rolling bodies are clamped by the three elements (the first to third power transmission elements) of the four power transmission elements and the rolling bodies are held by the remaining transmission element (the fourth power transmission element) so as to freely rotate on their axes and to freely tilt. The rolling bodies are disposed radially about the first rotation center axis R1. The rolling bodies are clamped by the first and second power transmission elements disposed in confrontation with each other in the axial direction and disposed on the outer circumferential surface of the third power transmission element.

The stepless transmission mechanism can transmit torque between the first to fourth power transmission elements via the rolling bodies. For example, the stepless transmission mechanism can transmit torque (power) between the first to third power transmission elements via the rolling bodies by generating traction force (tangential force) between the first to third power transmission elements and the rolling bodies. The traction force is generated by pressing at least one of the first and second power transmission elements against the rolling bodies. Further, in the stepless transmission mechanism, allowing the rotation of the fourth power transmission element can cause torque to be transmitted between the fourth power transmission element and the rolling bodies.

Further, in the stepless transmission mechanism, a ratio of rotating speed (of the number of rotations), that is, a gear ratio γ between the input and output is changed by tilting the second rotation center axis R2 of the rolling bodies to the first rotation center axis R1 on the tilt surface and tilting the rolling bodies.

The stepless transmission mechanism includes a configuration in which all the first to fourth power transmission elements are used as the rotation elements that can relatively rotate to the transmission shaft and a configuration in which any one of the first to fourth power transmission elements is used as a fixed power transmission element that cannot relatively rotate to the transmission shaft. In the former configuration, any one of the first to fourth power transmission elements acts as a torque input section and a power transmission element other than the above power transmission element acts as a torque output section. In contrast, in the latter configuration, since torque is transmitted between the three power transmission elements other than the fixed power transmission element via the rolling bodies, any one of the three power transmission elements acts as the torque input section and a power transmission element other than the above power transmission element acts as the torque output section. Because of this, in the stepless transmission mechanism, the ratio of rotating speed (of the number of rotations) between the power transmission element that acts as the input section and the power transmission element that acts as the output section becomes the gear ratio γ. For example, the stepless transmission 1 is disposed on a power transmission path of a vehicle. At the time, the input section is coupled with a power source side such as an engine (an engine such as an internal combustion engine, etc.) and a rotating machine (an electric motor, etc.), etc. and the output section is coupled with a drive wheel side. Another transmission (for example, a stepped variable manual transmission, an automatic transmission, etc.) may be interposed between the stepless transmission 1 and the drive wheel side. In the stepless transmission 1, the rotating operation of the power transmission elements when torque is input to the power transmission element as the input section is called a positive drive, and the rotating operation of the power transmission elements when torque in a direction opposite to that at the time of positive drive is input to the power transmission element as the output section is called an opposite drive. For example, according to the exemplification of the vehicle described above, the stepless transmission 1 carries out the positive drive when torque is input from the power source side to the power transmission element acting as the input section and rotates the power transmission element as at the time of speed-up, etc. and carries out the opposite drive when torque is input from the drive wheel side to the power transmission element as the output section, which is being rotated, in the direction opposite to that at the time of positive drive as at the time of speed-down, etc.

In the stepless transmission 1, the first and second power transmission elements carry out the function of a ring gear, etc. that are referred to in the traction planetary mechanism. The third power transmission element and the fourth power transmission element function as a sun roller and a carrier in a traction planetary mechanism, respectively. Further, the rolling bodies function as ball type pinions in the traction planetary mechanism. Accordingly, the stepless transmission 1 includes first and second rotating bodies 10, 20 as the first and second power transmission elements, a sun roller 30 as the third power transmission element, a carrier 40 as the fourth power transmission element, planetary balls 50 as the rolling bodies, and a shaft 60 as the transmission shaft. The shaft 60 is fixed to a fixing section of the stepless transmission 1 in a not illustrated cabinet, a vehicle body, etc. and is composed of a columnar or cylindrical fixed shaft that is configured so as not to relatively rotate to the fixing section. In the stepless transmission 1, a state that the first rotation center axis R1 and the second rotation center axis R2 are in parallel with each other on the tilt surface (a state of FIG. 1) is defined as a reference position. Note that, exemplified here is a case that the carrier 40 is used as the fixed element. However, it is only made possible to rotate a rotating disk member 42 to be described later.

The first and second rotating bodies 10, 20 are a disk member (a disk) and a ring member (ring) having a center axis in agreement with the first rotation center axis R1 and disposed so as to clamp the planetary balls 50 that are caused to be in confrontation with each other in the axial direction. In the exemplification, both the first and second rotating bodies 10, 20 are composed of the ring member.

The stepless transmission 1 has contact sections P1, P2 where the first and second rotating bodies 10, 20 and the planetary balls 50 are in point contact (strictly, in elliptical surface contact) with each other. Although described later in detail, the planetary balls 50 have an outer circumferential curved surface as a rolling surface and are clamped by the first and second rotating bodies 10, 20 on the outer circumferential curved surface. Namely, the planetary balls 50 have the contact sections P1, P2 on the outer circumferential curved surface thereof. In contrast, the first and second rotating bodies 10, 20 clamp the planetary balls 50 from outside in the radial direction and have the contact sections P1, P2 on the inner circumferential surfaces 10a, 20a thereof. On the inner circumferential surfaces 10a, 20a, the contact sections P1, P2 that are actually in contact with the planetary balls 50 and the sections that become the contact sections P1, P2 in association with the rotation of the first and second rotating bodies 10, 20 (hereinafter, called "additional contact sections") are connected in the circumferential direction. Namely, the additional contact sections are sections that come into contact with the planetary balls 50 and are away from the planetary balls 50 repeatedly as the first and second rotating bodies 10, 20 rotate. The contact sections P1, P2 and the additional contact sections of the first and second rotating bodies 10, 20 are formed in a shape of, for example, a concave arc surface having the same curvature as the curvature of the outer circumferential curved surface of the planetary balls 50, a concave arc surface having a curvature different from the curvature thereof, a convex arc surface, a flat surface, etc. Then, the shape in the contact sections P1, P2 and the additional contact sections of the first and second rotating bodies 10, 20 are formed such that when force (press force) in the axial direction is applied from the first and second rotating bodies 10, 20 to the planetary balls 50, force (normal force) is applied to the planetary balls 50 inside of the radial direction and in an oblique direction.

The inner circumferential surfaces 10a, 20a of the first and second rotating bodies 10, 20 and the outer circumferential curved surface of the planetary balls 50 are formed so that the distances from the second rotation center axis R2 to the respective contact sections P1, P2 and the additional contact sections become the same distances in the state of the reference position. Further, the inner circumferential surfaces 10a, 20a of the first and second rotating bodies 10, 20 and the outer circumferential curved surface of the planetary balls 50 are formed so that the contact angles θ between the first and second rotating bodies 10, 20 and the planetary balls 50 become the same angle. Each of the contact angles θ is an angle formed by the lines, which connect the contact sections P1, P2 or the additional contact sections to the centers (the centers are the centers of rotation on their axes and the centers of tilt rotation, and if the balls are a sphere, the centers correspond to a center of gravity) of the planetary balls 50, with respect to the reference plane. The reference plane is a plane extending in the radial direction and having the centers of the planetary balls 50.

In the exemplification, the first rotating body 10 is used as the torque input section at the time of positive drive, and the second rotating body 20 is used as the torque output section at the time of positive drive. Accordingly, the first rotating body 10 is coupled with an input shaft (a first rotating shaft) 11 and the second rotating body 20 is coupled with an output shaft (a second rotating shaft) 21. The input shaft 11 and the output shaft 21 can relatively rotate in the circumferential direction to the shaft 60. Further, the input shaft 11 and the output shaft 21 can relatively rotate also therebetween in the circumferential direction via a bearing B1 and a thrust bearing TB.

An axial force generator 71 for generating axial force is disposed between the input shaft 11 and the first rotating body 10. The axial force is press force in the axial direction for pressing the first rotating body 10 against the planetary balls 50. A torque cam is used as the axial force generator 71. Accordingly, engaging an engagement section or an engagement member of the input shaft 11 side with an engagement section or an engagement member of the first rotating body 10 side causes the axial force generator 71 to generate the axial force between the input shaft 11 and the first rotating body 10 and to transmit rotation torque so that the input shaft 11 and the first rotating body 10 are rotated integrally. In contract, in the stepless transmission 1, an axial force generator 72 is disposed also between the output shaft 21 and the second rotating body 20. The axial force generator 72 generates press force (axial force) for pressing the second rotating body 20 against the planetary balls 50 and uses a torque cam similar to the axial force generator 71. The axial force generator 72 is connected to the output shaft 21 via a ring member 22. Note that, in the stepless transmission 1, it is sufficient that at least one of the axial force generators 71, 72 is disposed.

The stepless transmission 1 can generate the traction force by the axial force in operation between the first rotating body 10 and the respective planetary balls 50, between the second rotating body 20 and the planetary balls 50, and between the sun roller 30 and the planetary balls 50.

The sun roller 30 is disposed concentrically with the shaft 60 and relatively rotates in the circumferential direction to the shaft 60. The plural pieces of the planetary balls 50 are radially disposed on the outer circumferential surface of the sun roller 30 at approximately equal intervals. Accordingly, in the sun roller 30, the outer circumferential surface thereof acts as a rolling surface when each planetary ball 50 rotates on its axis. The sun roller 30 can cause the planetary balls 50 to roll (to rotate on their axes) by the rotating operation thereof, and can rotate in association with the rolling operation (the rotation on their axes) of the planetary balls 50.

The sun roller 30 of the embodiment disperses the contact section with the planetary balls 50 to two locations (a first contact section P3 and a second contact section P4) in the axial direction. This is because that a spin loss is reduced by reducing surface pressure by dispersing the contact force between the sun roller 30 and the planetary balls 50 so that the deterioration of power transmission efficiency can be suppressed and further durability can be improved. The first contact section P3 is disposed to one side of axial direction about the reference plane. In contrast, the second contact section P4 is disposed on the other side of the axial direction about the reference plane. The first and second contact sections P3, P4 are disposed at the locations that have the same distances from the centers of the planetary balls 50 (the centers of rotation on axis and the centers of tilt, and if the planetary balls are a sphere, the centers correspond to a center of gravity) and have also the same distances from the first rotation center axis R1. In the first and second contact sections P3, P4, the sun roller 30 and the planetary balls 50 are in point contact (strictly, in a surface contact) with each other.

The sun roller 30 is divided to two rotating bodies (a first rotating body 31, a second rotating body 32) that can relatively rotate in the circumferential direction to the shaft 60 and the first rotating body 31 is provided with the first contact section P3 and the second rotating body 32 is provided with the second contact section P4. This is because that relatively rotating the first and second rotating bodies 31, 32 in the circumferential direction each other can reduce the loss energy between the sun roller 30 and the planetary balls 50 and suppress the deterioration of the power transmission efficiency.

In the sun roller 30, the first rotating body 31 is disposed on the one side of the axial direction about the reference plane and the second rotating body 32 is disposed on the other side of the axial directions about the reference plane. The first and second rotating bodies 31, 32 are attached to the shaft 60 via an angular bearing AB and a radial bearing RB, respectively so as to be able to relatively rotate in the circumferential direction to the shaft 60.

In the first contact section P3, press force is caused to act from the first rotating body 31 on each planetary ball 50 in the axial direction on the second rotating body 32 side and in an oblique direction toward outside in the radial direction. On the other hand, in the second contact section P4, press force is caused to act from the second rotating body 32 to each planetary ball 50 in the axial direction on the first rotating body 31 side and in the oblique direction toward outside in the radial direction. Because of this, in the sun roller 30, the first rotating body 31 has a conical section having an outside diameter that is uniformly reduced as the first rotating body 31 approaches the second rotating body 32, and the second rotating body 32 has a conical section having an outside diameter that is uniformly reduced as the second rotating body 32 approaches the first rotating body 31. The first contact section P3 and the second contact section P4 are disposed on the outer circumferential surfaces of the conical sections thereof. Further, the first rotating body 31 and the second rotating body 32 may replace the conical sections with arc-shaped pyramid sections. The arc-shaped pyramid section has such a shape that as the arc-shaped pyramid section approaches the other rotating body, the outside diameter thereof is reduced in a parabola state. The first contact section P3 and the second contact section P4 are disposed on the outer circumferential surfaces of the arc-shaped pyramid sections thereof. The conical section and the arc-shaped pyramid section are formed on the entire outer circumferential surface or a part of the outer circumferential surface of the first rotating body 31 and the second rotating body 32.

The planetary balls 50 are the rolling bodies that roll on the outer circumferential surface of the sun roller 30 about support shafts 51. Although each planetary ball 50 is preferably a perfectly spherical body, the planetary ball 50 may be a body that forms a spherical shape in at least a roll direction, for example, may be a body having a cross section formed in an elliptical shape such as a rugby ball.

On the outer circumferential surface of each planetary ball 50 as the rolling surface, the contact sections P1, P2 that are actually in contact with the first and second rotating bodies 10, 20 and the sections that become the contact sections P1, P2 in association with the rotation on axis of each planetary ball 50 (additional contact sections) are connected each other in the circumferential direction about the second rotation center axis R2, respectively. Each additional contact section in contact with the first rotating body 10 is a section that comes into contact with the first rotating body 10 or is away from the first rotating body 10 repeatedly in association with the rotation of each planetary ball 50 on its axis. The contact section P1 and the additional contact section in contact with the first rotating body 10 form a ring that uses the shortest distance between the second rotation center axis R2 and the contact section P1 as its radius (contact radius). Each additional contact section in contact with the second rotating body 20 is a section that comes into contact with the second rotating body 20 or is away from the second rotating body 20 repeatedly in association with the rotation of each planetary ball 50 on its axis. The contact section P2 and the additional contact section with the second rotating body 20 form a ring that uses the shortest distance between the second rotation center axis R2 and the contact section P2 as its radius (a contact radius).

The contact sections P1, P2 and the additional contact section move according to the gear ratio $\gamma$. For example, when the gear ratio $\gamma$ is changed to a speed-up side as described later, as the gear ratio $\gamma$ changes, the ring, which is formed by the contact section P1 and the additional contact section in contact with the first rotating body 10, moves in the direction where the radius of the ring is reduced in the axial direction of the second rotation center axis R2 and the ring, which is formed by the contact section P2 and the additional contact section in contact with the second rotating body 20 moves in the direction where the radius of the ring is increased in the axial direction of the second rotation center axis R2. In contrast, when the gear ratio $\gamma$ is changed to a speed-down side as described later, as the gear ratio $\gamma$ changes, the ring, which is formed by the contact section P1 and the additional contact section in contact with the first rotating body 10, moves in the direction where the radius of the ring is increased in the axial direction of the second rotation center axis R2 and the ring, which is formed by the contact section P2 and the additional contact section in contact with the second rotating body 20, moves in the direction where the radius of the ring is reduced in the axial direction of the second rotation center axis R2.

Each of the support shafts 51 is caused to pass through the center of the planetary ball 50 and rotatably supports the planetary ball 50. For example, the planetary ball 50 can carry out a relative rotation (a rotation on its axis) to the support shaft 51 about the second rotation center axis R2 by a bearing such as a needle bearing disposed in contact with the outer circumferential surface of the support shaft 51. Both the ends of the support shaft 51 are caused to protrude from each planetary ball 50.

The position that becomes the reference of the support shaft 51 is the reference position illustrated in FIG. 1 described above and is the position where the second rotation center axis R2 is in parallel with the first rotation center axis R1. The support shaft 51 can be caused to swing (tilt) between the reference position and a position tilted therefrom together with the planetary ball 50. The tilt operation is carried out in the tilt surface using the center of the planetary ball 50 as a fulcrum.

The carrier 40 supports the protruding sections of the support shafts 51 so as not to prevent the tilt operation of the planetary balls 50. The carrier 40 has first to third disk sections 41, 42, 43 disposed, for example, in confrontation with each other in the axial direction with the center axes thereof in agreement with the first rotation center axis R1. In the carrier 40, the first disk section 41 and second disk section 42 are disposed at intervals in the axial direction and the third disk section 43 is disposed in the vicinity of one of the first disk section 41 and second disk section 42. In the carrier 40, the sun roller 30 and the planetary ball 50 are disposed between two disk sections of the first to third disk sections 41, 42, 43. In the exemplification, the third disk section 43 is disposed between the first disk section 41 and second disk section 42 in the vicinity of the second disk section 42 and the sun roller 30 and the planetary ball 50 are disposed between the first disk section 41 and the third disk section 43. Note that, in the carrier 40, it is not always necessary to provide the third disk section 43.

In the carrier 40, one of the first and second disk section 41, 42 is configured to be able to carry out a relative rotation in the circumferential direction to the shaft 60 and the other of the first and second disk section 41, 42 is configured to be unable to carry out the relative rotation in the circumferential direction to the shaft 60. Further, the third disk section 43 is configured to be unable to carry out the relative rotation in the circumferential direction to the shaft 60. In the exemplification, the first and third disk sections 41, 43 are configured to be unable to carry out the relative rotation to the shaft 60 and the second disk section 42 is configured to be able to carry out the relative rotation to the shaft 60. The first disk section 41 fixes the inside diameter side thereof to the outside diameter side of the shaft 60 by, for example, a screw member, etc. The second disk section 42 attaches its inside diameter side to the outside diameter side of the shaft 60 by, for example, a bearing (illustration omitted). The third disk section 43 is connected to the first disk section 41 by, for example, plural pieces of support shafts (illustration omitted). The first disk section 41 and the third disk section 43 are formed in a basket shape and a part of the planetary ball 50 is caused to protrude from a space between the support shafts. Note that the first and second rotating bodies 10, 20 come into contact with the protruding section of the planetary ball 50. Hereinafter, the first disk section 41 is called a first fixed disk section 41, the second disk section 42 is called a rotating disk section 42, and the third disk section 43 is called a second fixed disk section 43.

In the stepless transmission 1, when the tilt angle of the planetary balls 50 is at the reference position, that is, 0 degree, the first rotating body 10 and the second rotating body 20 rotate at the same rotation speed (the same number of rotations). Namely, at the time, the speed ratio (the ratio of rotation speeds or the number of rotations) of the first rotating body 10 to the second rotating body 20 becomes 1 and the gear ratio $\gamma$ becomes 1. In contrast, when the planetary balls 50 are tilted from the reference position, the shortest distance between the center axis of the support shaft 51 (the second rotation center axis R2) and the contact section P1 changes and further the shortest distance between the center axis of the support shaft 51 and the contact section P2 changes. Because of this, any one of the first rotating body 10 and the second rotating body 20 rotates at a high speed higher than that at the reference position and the other of the first rotating body 10 and the second rotating body 20 rotates at a low speed. For example, when the planetary ball 50 is tilted in a direction, the second rotating body 20 rotates at a speed lower than that of the first rotating body 10 (speed-down), and when the planetary ball 50 is tilted in the other direction, the second rotating body 20 rotates at a speed higher than that of the first rotating body 10 (speed-up). Accordingly, in the stepless transmission 1, the speed ratio (the gear ratio $\gamma$) of the first rotating body 10 to the second rotating body 20 can be steplessly changed by changing the tilt angle of the planetary ball 50. Note that, at the time of speed-up ($\gamma$>1), the planetary ball 50 on the upper side in FIG. 1 is tilted in a counterclockwise direction on the sheet and the planetary ball 50 on the lower side is tilted in a clockwise direction. Further, at the time of speed-down ($\gamma$>1), the planetary ball 50 on the upper side in FIG. 1 is tilted in the clockwise direction on the sheet and the planetary ball 50 on the lower side is tilted in the counterclockwise direction. Hereinafter, the gear ratio $\gamma$ at the time of speed-up is called a speed-up side gear ratio and the gear ratio γ at the time of speed-down is called a speed-down side gear ratio.

The stepless transmission 1 is provided with a transmission device for changing the gear ratio γ. Since the gear ratio γ is changed by the change of the tilt angle of the planetary ball 50, the transmission device uses a tilt device for tilting the planetary balls 50. Here, the carrier 40 is provided with a function as the tilt device (a transmission device).

Figure 2:
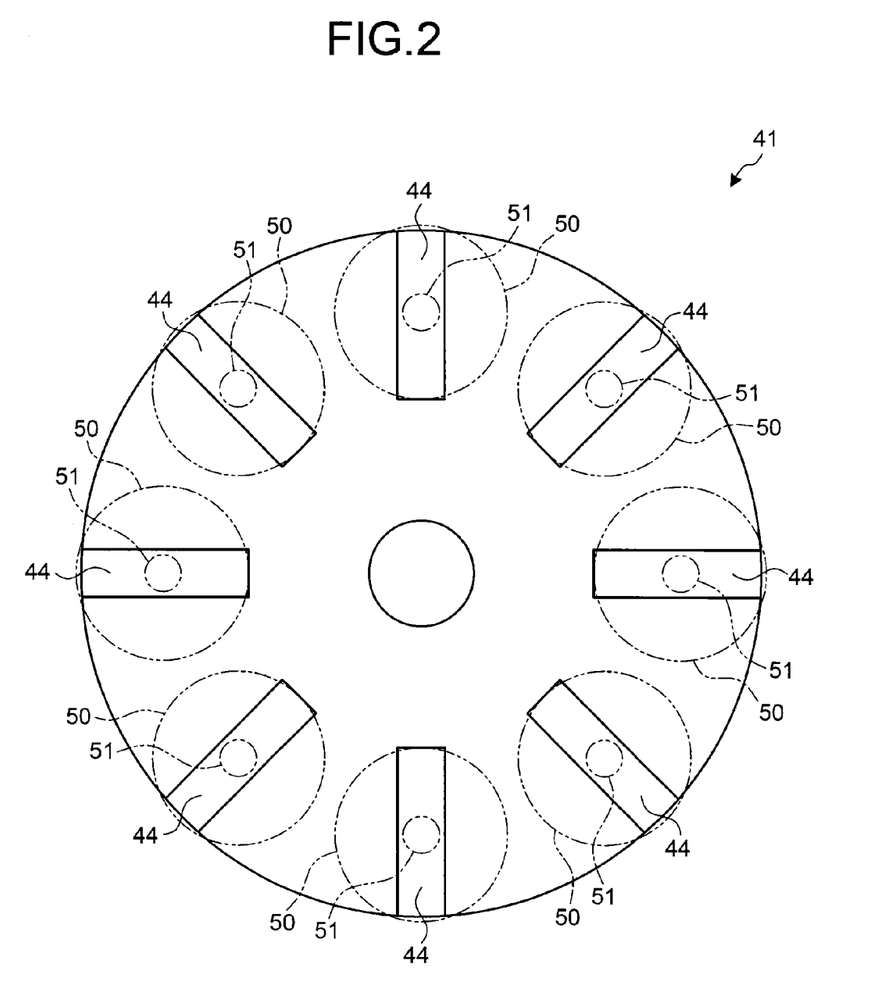
FIG. 2 is a view explaining one of fixed disk sections of a carrier.
Figure 3:
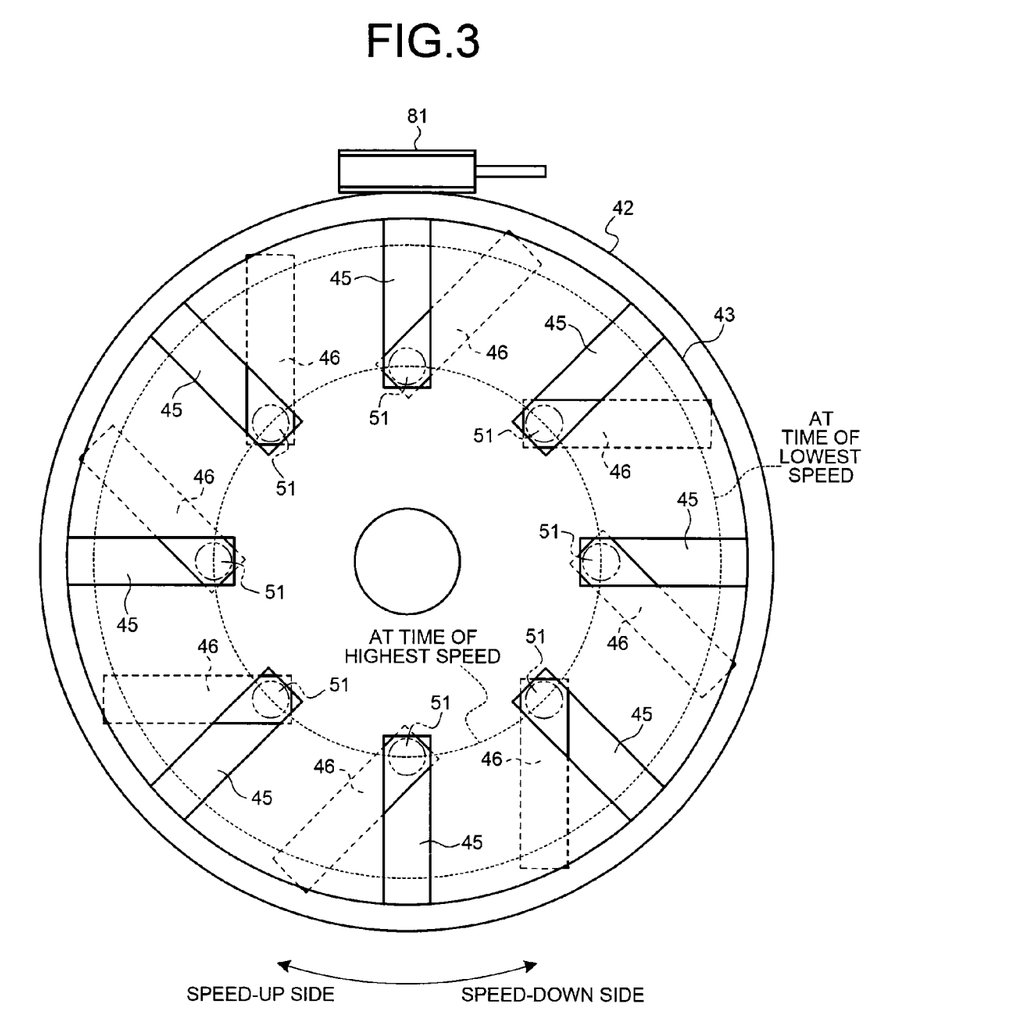
FIG. 3 is a view explaining the other fixed disk section and a rotating disk section in the carrier.

First, the first and second fixed disk sections 41, 43 are provided with radial guide sections 44, 45 disposed to each planetary ball 50. The radial guide sections 44, 45 are guide sections that guide, when tilt force is applied to one end of the support shaft 51 protruding from the planetary ball 50, the end in the radial direction. Each of the radial guide sections 44 is a guide groove and a guide hole using, for example, a longitudinal direction as the radial direction (FIG. 2). In contrast, the radial guide section 45 is a guide hole using a longitudinal direction as the radial direction (FIG. 3) causes the support shaft 51 to pass therethrough. Namely, in the first and second fixed disk sections 41, 43, when viewed from the axial direction, the radial guide sections 44, 45 form a radial shape about the first rotation center axis R1. The radial guide sections 44, 45 are formed at positions that confront each other on the axial direction and hold the support shaft 51 so that the second rotation center axis R2 is positioned on an approximately tilt surface regardless of the magnitude of the gear ratio γ. A reason why "approximately" is used is that a slight space is formed between the support shaft 51 and the radial guide sections 44, 45 in the width direction thereof so that the support shaft 51 carries out a smooth tilt operation. Note that FIG. 2 is a view when the first fixed disk section 41 is observed from the planetary ball 50 side in the axial direction. FIG. 3 is a view when the rotating disk section 42 and the second fixed disk section 43 are observed from the planetary ball 50 side in the axial direction.

As described above, the rotating disk section 42 can carry out the relative rotation in the circumferential direction to the shaft 60. For the relative rotation, an actuator (a drive unit) such as a not illustrated electric motor is used. The driving force of the drive unit is transmitted to the outer circumferential portion of the rotating disk section 42 via a worm gear 81 illustrated in FIG. 3.

In contrast, the rotating disk section 42 is provided with a tilt force application unit 46 disposed to each planetary ball 50. The tilt force application unit 46 causes tilt force to act on the one end of the support shaft 51 protruding from the planetary ball 50 in association with the rotation of the rotating disk section 42. For example, the tilt force application unit 46 is a linear groove and hole the longitudinal direction of which tilts to the radial direction at a predetermined tilt angle (FIG. 3). When viewed from the axial direction, a part of the tilt force application unit 46 overlaps a part of the radial guide section 45. The intersecting portions where the parts thereof overlap each other move in the radial direction together with the rotation of the rotating disk section 42. The one end of the support shaft 51 is supported by the intersecting portions. Accordingly, when the rotating disk section 42 is rotated, the tilt force acts on the one end of the support shaft 51 from the side wall surface of the tilt force application unit 46 and the one end is guided in the radial direction by the radial guide sections 44, 45. In the stepless transmission 1, the guide operation becomes the tilt operation of the planetary ball 50.

Specifically, in the carrier 40, relatively rotating the first fixed disk section 41 and the rotating disk section 42 causes the tilt force according to the relative rotation to act on the one end of the support shaft 51. For example, when the rotating disk section 42 is rotated in the clockwise direction on the sheet of FIG. 3, the tilt force application unit 46 presses the one end of the support shaft 51 along an inner side wall thereof in the radial direction. At the time, since the press force becomes the tilt force and the one end of the support shaft 51 is moved inside in the radial direction by the radial guide sections 44, 45, the gear ratio γ is changed to a speed-up side than before rotation. In contrast, when the rotating disk section 42 is rotated in the counterclockwise direction on the sheet of FIG. 3, the tilt force application unit 46 presses the one end of the support shaft 51 along an outer side wall thereof in the radial direction. At the time, since the press force becomes the tilt force and the one end of the support shaft 51 is moved outside in the radial direction by the radial guide sections 44, 45, the gear ratio γ is changed to a speed-down side in comparison with before rotation. Note that since the planetary ball 50 is clamped by the first rotating body 10, the second rotating body 20, and the sun roller 30, if the planetary ball is the sphere, the planetary ball 50 tilts about the position of a center of gravity when the tilt force is applied thereto.

In the stepless transmission 1, lubricant (so-called traction oil) is used to cool the respective sections (the objects to be cooled and the objects to be lubricated) and to generate a traction force. For example, the lubricant is supplied from an oil pump (illustration omitted) to an axial center oil path 61 of the shaft 60 and supplied to the respective sections (the objects to be cooled and the objects to be lubricated) of the stepless transmission 1 via a radial oil path 62.

In the stepless transmission 1, when torque is input to the first rotating body 10 via the input shaft 11, axial force according to the input torque and the output torque of the second rotating body 20 is generated by the axial force generators 71, 72. A normal force Fn acts on the contact sections P1, P2 of the first and second rotating bodies 10, 20 and the planetary balls 50 by the axial force, thereby respective traction forces Ft according to the normal force Fn and a traction coefficient μt are generated (Ft=μt*Fn). In the stepless transmission 1, power is transmitted between the input and output by the traction force Ft. The normal force Fn is the multiplied value of the area and the contact pressure of a contact ellipse in the contact sections P1, P2.

Incidentally, in the stepless transmission 1, the spin between the first rotating body 10 and the planetary balls 50 and between the second rotating body 20 and the planetary balls 50 causes a loss (a so-called spin loss) due to the heat generation of the contact sections P1, P2. The spin loss deteriorates the power transmission efficiency in the contact sections P1, P2. Because of this, the stepless transmission 1 is required to reduce the spin loss.

For example, when the gear ratio γ is 1, the spin speed (hereinafter, called "input side spin speed") between the first rotating body 10 and the planetary balls 50 in the contact section P1 on a torque input side becomes the same speed as the spin speed (hereinafter, called "output side spin speed") between the second rotating body 20 and the planetary balls 50 in the contact section P2 on a torque output side. At the time of speed-up side gear ratio, the reduction of the gear ratio γ makes the input side spin speed large and the output side spin speed small. Namely, at the time of speed-up side gear ratio, the reduction of the gear ratio γ makes the input side spin speed larger than the output side spin speed. In contrast, at the time of speed-down side gear ratio, the increase of the gear ratio γ makes the input side spin speed small and the output side spin speed large. Namely, at the time of speed-down side gear ratio, the increase of the gear ratio γ makes the output side spin speed larger than the input side spin speed large. Accordingly, in the stepless transmission 1, at the time of speed-up side gear ratio, the spin loss of the contact section P1 becomes larger than the contact section P2, whereas at the time of speed-down side the gear ratio, the spin loss of the contact section P2 becomes larger than the contact section P1.

In the stepless transmission 1, when it is desired to increase the range of the speed-up side gear ratio (namely, when it is desired to more reduce a minimum gear ratio γmin), it is necessary to reduce the spin loss of the contact section P1 at the time of speed-up side gear ratio. Further, in the stepless transmission 1, when it is desired to increase the range of the speed-down side gear ratio (namely, when it is desired to more reduce a maximum gear ratio γmax), it is necessary to reduce the spin loss of the contact section P2 at the time of speed-down side gear ratio. To reduce the spin loss, a method of reducing the spin speed (or the spin amount) of the contact sections P1, P2 as the objects to be reduced, a method of reducing the area of the contact ellipse in the contact sections P1, P2 as the objects to be reduced, and method of reducing the contact pressure of the contact ellipse of the contact ellipse in the contact sections P1, P2 as the objects to be reduced are available. In the embodiment, the spin loss is reduced by reducing the area of the contact ellipse.

Further, the increase of the spin speed more increases the traction coefficient μt of the contact sections P1, P2. When it is assumed that the area and the contact pressure of the contact ellipse become the same magnitudes, respectively in the respective contact sections P1, P2, the normal forces Fn of the contact sections P1, P2 become the same magnitude by the axial forces of thus, the axial force generators 71, 72. Because of the reason, at the time of speed-up side gear ratio, the traction force Ft of the contact section P1 becomes larger than the traction force Ft of the contact section P2. Accordingly, in the contact section P2, since the region in which the traction coefficient pt is small is used, the performance of lubricant cannot be perfectly used and further the contact pressure of the contact ellipse becomes excessive, there is a fear that the durability of the second rotating body 20 and the planetary balls 50 is deteriorated. In contrast, at the time of speed-down side gear ratio, the traction force Ft of the contact section P1 becomes larger than the traction force Ft of the contact section P2. Accordingly, in the contact section P1, since the region in which the traction coefficient pt is small is used, the performance of lubricant cannot be perfectly used and further the contact pressure of the contact ellipse becomes excessive, there is a fear that the durability of the first rotating body 10 and the planetary balls 50 is deteriorated. Thus, unless the durability of the first rotating body 10, etc. is improved, it is difficult for the stepless transmission 1 to increase the range of the speed-up side gear ratio or speed-down side gear ratio.

To cope with the problem, in the stepless transmission 1, when the range of the speed-up side gear ratio is increased, the area of the contact ellipse of the contact section P1 is configured to become narrower than the area of the contact ellipse of the contact section P2, whereas when the range of the speed-down side gear ratio is increased, the area of the contact ellipse of the contact section P2 is configured to become narrower than the area of the contact ellipse of the contact section P1.

Specifically, in the stepless transmission 1, the Young's modulus of the contact section P1(P2) and the additional contact section in contact with the planetary ball 50 in one of the first and second rotating bodies 10, 20 is made larger than the contact section P2(P1) and the additional contact section in contact with the planetary ball 50 in the other of first and second rotating bodies 10, 20.

For example, in a vehicle that uses the speed-up side gear ratio often, the Young's moduli of the contact section P1 and the additional contact section in contact with the planetary balls 50 in the inner circumferential surface 10a of the first rotating body 10, which is the torque input side, is made larger than the Young's moduli of the contact section P2 and the additional contact section in contact with the planetary ball 50 in the inner circumferential surface 20a of the second rotating body 20 which is the torque output side.

Figure 4:
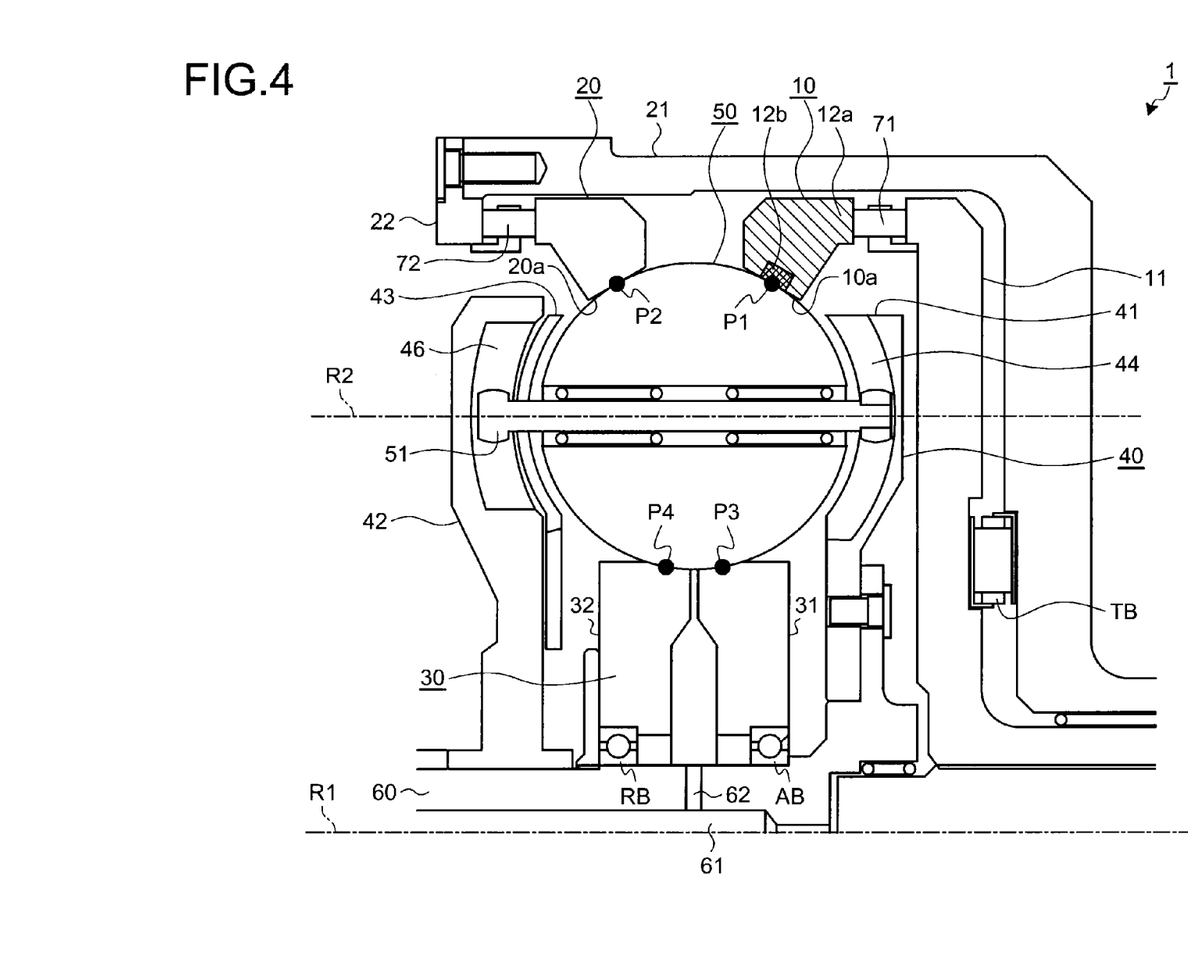
FIG. 4 is a view illustrating an example of a first rotating body in an embodiment.
Figure 5:
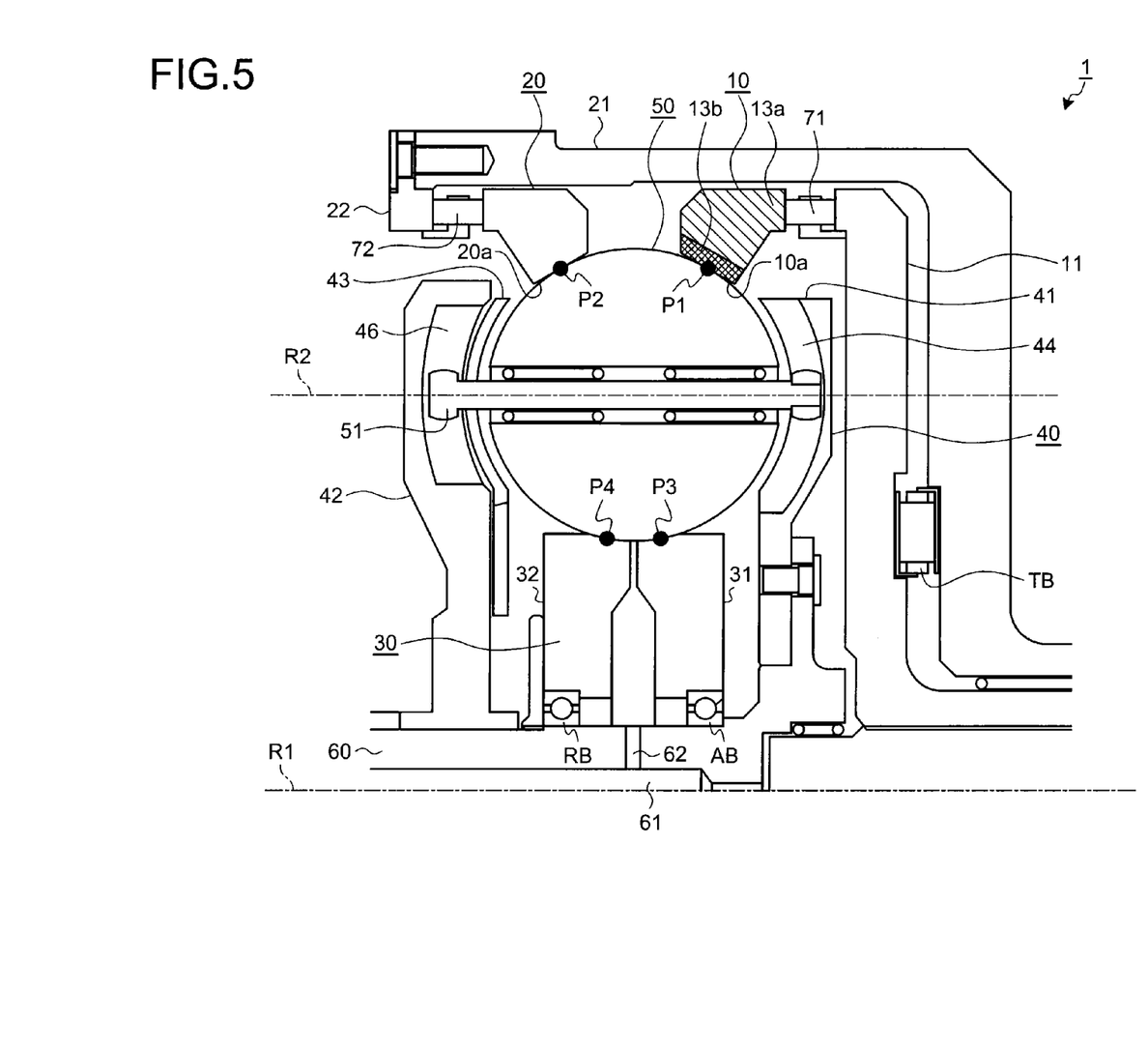
FIG. 5 is a view illustrating other example of the first rotating body in the embodiment.

In that case, the first rotating body 10 provides the material or the surface treatment of the contact section P1 and the additional contact section in at least the inner circumferential surface 10a thereof with the Young's moduli larger than that of the contact section P2 and the additional contact section in the inner circumferential surface 20a of the second rotating body 20. When the Young's modulus is coped with by the material, for example, a material having the Young's modulus larger than the material of the second rotating body 20 is used as a material of the first rotating body 10. Further, in the stepless transmission 1, the first rotating body 10 may be configured of at least two members, and the Young's modulus of the member, which has the contact section P1 and the additional contact section, of the two members may be made larger than the contact section P2 and the additional contact section in the inner circumferential surface 20a of the second rotating body 20. For example, in the stepless transmission 1, a ring member 12b, which is composed of a material having a Young's modulus larger than those of the contact section P2 and the additional contact section in the inner circumferential surface 20a, may be prepared and the ring member 12b may be buried in a main member 12a of the first rotating body 10 as the contact section P1 and the additional contact section in the inner circumferential surface 10a (FIG. 4). At the time, it is preferable to make the Young's modulus of the ring member 12b of the first rotating body 10 larger than the Young's modulus of the main member 12a of the first rotating body 10 and to make, for example, the Young's modulus of the main member 12a the same as the Young's modulus of the second rotating body 20 to reduce cost. Further, the stepless transmission 1 may be configured such that a ring member 13b having the inner circumferential surface 10a in its entirety is prepared as a member different from a main member 13a of the first rotating body 10 and the first rotating body 10 is formed by fixing the main member 13a and the ring member 13b each having a different Young's modulus (FIG. 5). The ring member 13b is molded of a material having a Young's modulus larger than that of the contact section P2 and the additional contact section in the inner circumferential surface 20a. At the time, it is preferable to make the Young's modulus of the ring member 13b of the first rotating body 10 larger than the Young's modulus of the main member 13a of the first rotating body 10 and to make, for example the Young's modulus of the main member 13a the same as the Young's modulus of the second rotating body 20 to reduce cost. In contrast, when the Young's modulus is coped with by the surface treatment, it is sufficient to apply, for example, a shot blast (for example, shot doping) treatment to at least the contact section P1 and the additional contact section in the inner circumferential surface 10a. Note that, in FIGS. 4, 5, hatching is applied only partly.

In the stepless transmission 1 of the case, the area of the contact ellipse of the contact section P1 becomes smaller than the area of the contact ellipse of the contact section P2 and further the contact pressure of the contact ellipse of the contact section P1 becomes higher than the contact pressure of the contact ellipse of the contact section P2. Because of the reason, in the contact section P1, even if the axial forces of the axial force generators 71, 72 are reduced in comparison with conventional modes in which the Young's moduli of the contact section P1, etc. in the first rotating body 10 are made to the same magnitudes as the Young's moduli of the contact section P2, etc. in the second rotating body 20, the contact pressure of the contact ellipse which is necessary to generate the target value of the traction force Ft can be secured. Further, in the contact section P1, it is possible to reduce the spin loss due to the reduction of the area of the contact ellipse while securing the contact pressure of the contact ellipse in comparison with the conventional modes. In addition to the above-mentioned, in the contact section P2, the contact pressure of the contact ellipse which may become excessive can be reduced by reducing the axial forces of the axial force generators 71, 72 in comparison with the conventional modes. Thus, in the contact section P2, it is possible to improve the durability of the second rotating body 20 and the planetary ball 50 while generating the target value of the traction force Ft in comparison with the conventional modes.

In contrast, in a vehicle that uses the speed-down side gear ratio often, the Young's moduli of the contact section P2 and the additional contact section in contact with the planetary ball 50 in the inner circumferential surface 20a of the second rotating body 20, which is the torque output side, is made larger than the Young's moduli of the contact section P1 and the additional contact section with the planetary ball 50 in the inner circumferential surface 10a of the first rotating body 10 which is the torque input side.

In that case, the Young's modulus of the material or the surface treatment of the contact section P2 and the additional contact section in at least the inner circumferential surface 20a of the second rotating body 20 is made larger than the Young's moduli of the contact section P1 and the additional contact section in the inner circumferential surface 10a of the first rotating body 10. It is sufficient to apply the material and the surface treatment in the same manner as those explained in the vehicle that uses the speed-up side gear ratio often.

In the stepless transmission 1 of the case, the area of the contact ellipse of the contact section P2 becomes smaller than the area of the contact ellipse of the contact section P1 and further the contact pressure of the contact ellipse of the contact section P2 becomes higher than the contact pressure of the contact ellipse of the contact section P1. Because of the reason, in the contact section P2, even if the axial forces of the axial force generators 71, 72 are reduced in comparison with the conventional modes in which the Young's moduli of the contact section P2, etc. in the second rotating body 20 are made to the same magnitudes as the Young's moduli of the contact section P1, etc. in the first rotating body 10, the contact pressure of the contact ellipse which is necessary to generate the target value of the traction force Ft can be secured. Further, in the contact section P2, it is possible to reduce the spin loss due to the reduction of the area of the contact ellipse while securing the contact pressure of the contact ellipse in comparison with the conventional modes. In addition to the above-mentioned, in the contact section P1, the contact pressure of the contact ellipse which may become excessive can be reduced by reducing the axial forces of the axial force generators 71, 72 in comparison with the conventional modes. Thus, in the contact section P1, it is possible to improve the durability of the first rotating body 10 and the planetary balls 50 while generating the target value of the traction force Ft in comparison with the conventional modes.

As described above, since the stepless transmission 1 of the embodiment has such a simple structure that the Young's moduli of the contact section P1 (P2) and the additional contact section in contact with the planetary ball 50 in one of the first and second rotating bodies 10, 20 is made larger than the contact section P2 (P1) and the additional contact section in contact with the planetary ball 50 in the other of the first and second rotating bodies 10, 20, no surface treatment, etc. need be applied to any location of the first and second rotating bodies 10, 20 according to the contact sections P1, P2 and the planetary ball 50. Accordingly, the stepless transmission 1 can improve the durability while suppressing the increase of cost and securing a performance as a traction drive.

Modification

According to this modification, in the stepless transmission 1 of the embodiment described above, the Young's moduli of the contact section P1 (P2) and the additional contact section in contact with one of the first and second rotating bodies 10 and 20 in the planetary ball 50 are made larger than the Young's moduli of the contact section P2 (P1) and the additional contact section in contact with the other of the first and second rotating bodies 10 and 20.

Specifically, in the vehicle that uses the speed-up side gear ratio often, the Young's moduli of the contact section P1 and the additional contact section in contact with the planetary ball 50 in the first rotating body 10 is made larger than the Young's moduli of the contact section P2 and the additional contact section in contact with the planetary ball 50 in the second rotating body 20 and further the Young's moduli of the contact section P1 and the additional contact section in contact with the first rotating body 10 in the planetary ball 50 is made larger than the Young's moduli of the contact section P2 and the additional contact section in contact with the second rotating body 20. In the planetary ball 50, the more reduction of the radius of the ring formed by the contact section P1 and the additional contact section more increases the Young's moduli of the contact section P1 and the additional contact section in contact with the first rotating body 10. The reduction of the radius of the ring in that case means a direction from the center side of the planetary ball 50 in the axial direction of the second rotation center axis R2 to the first fixed disk section 41 side.

Figure 6:
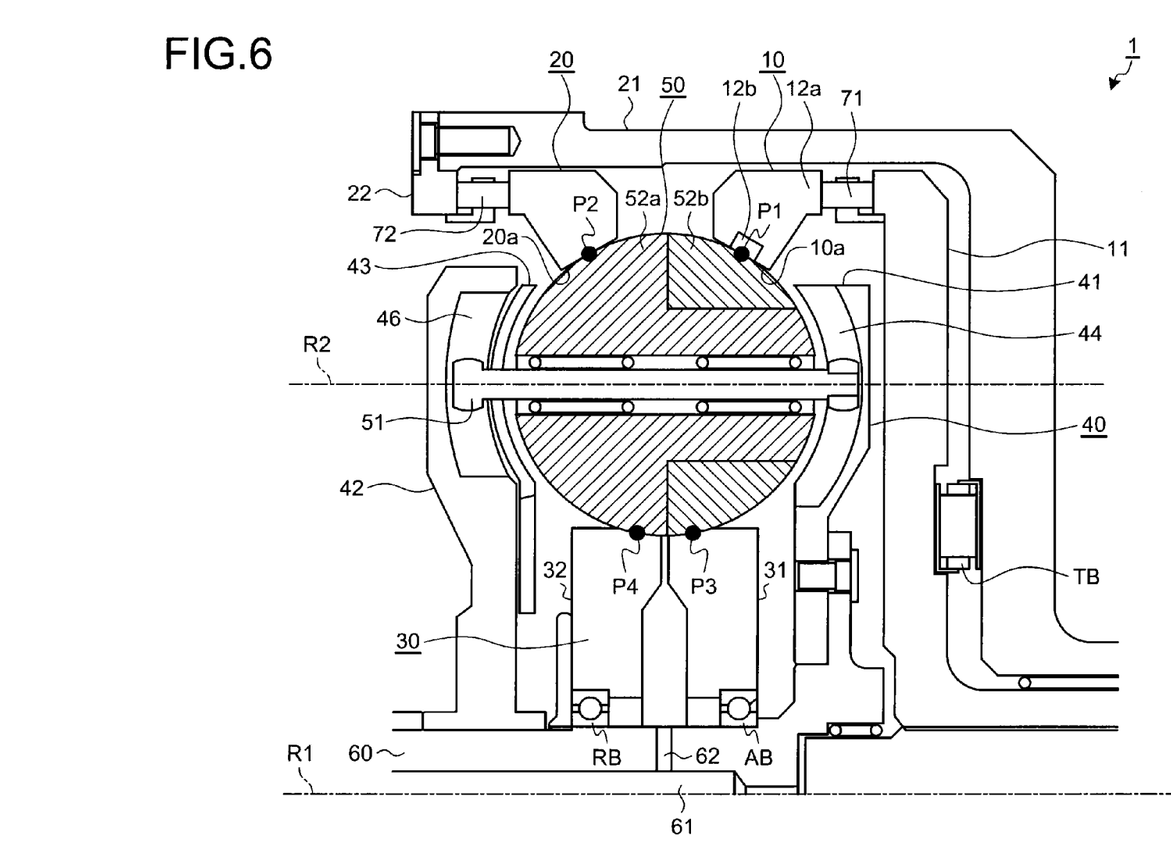
FIG. 6 is a view illustrating an example of a planetary ball in a modification.
Figure 7:
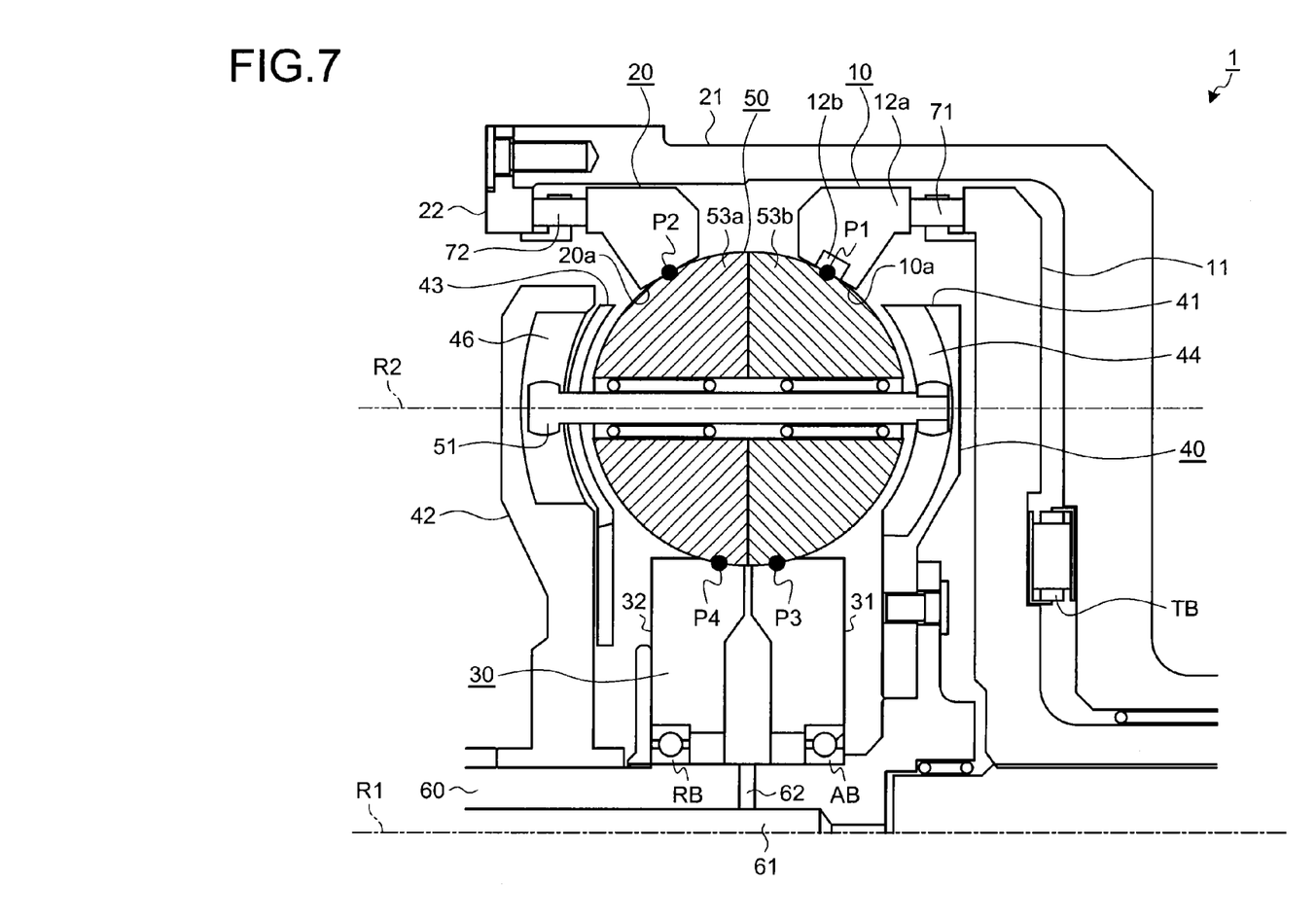
FIG. 7 is a view illustrating other example of the planetary ball in the modification.

In that case, the Young's modulus of the material or the surface treatment of the contact section P1 and the additional contact section, which is in contact with at least the first rotating body 10, of the planetary ball 50 is made larger than the Young's moduli of the contact section P2 and the additional contact section in contact with the second rotating body 20, and further the Young's modulus of the material or the surface treatment of the contact section P1 and the additional contact section in contact with the first rotating body 10 is made larger as the radius of the ring formed by the contact section P1 and the additional contact section becomes smaller. When the Young's modulus is coped with by the material, for example, a ring member 52b composed of a material having the large Young's modulus as described above is prepared and the ring member 52b is buried in a main member 52a of the planetary ball 50 as the contact section P1 and the additional contact section where the first rotating body 10 is in contact with the planetary ball 50. Further, the stepless transmission 1 may be configured such that the planetary ball 50 is formed by molding, for example, a half portion (an input side member) 53b of the planetary ball 50, which has the contact section P1 and the additional contact section in contact with the first rotating body 10, of a material having the large Young's modulus as described above and integrating the half portion with a remaining half portion (output side member) 53a. In contrast, when Young's modulus is coped with by the surface treatment, it is sufficient to apply a shot blast (for example, shot doping) treatment to, for example, at least the contact section P1 and the additional contact section in contact with the first rotating body 10 in the planetary ball 50. Note that, in FIGS. 6, 7, hatching is applied only partly. Further, the planetary balls 50 of FIG. 6, 7 are based on that illustrated in FIG. 4.

In the stepless transmission 1 in that case, the area of the contact ellipse of the contact section P1 can be made smaller than the area of the contact ellipse of the contact section P2 and further the contact pressure of the contact ellipse of the contact section P1 can be made larger than the contact pressure of the contact ellipse of the contact section P2 to the same level as those of the embodiment depending on how the hardness of the respective contact sections P1 and additional contact sections in the first rotating body 10 and the planetary balls 50 is set. Accordingly, the stepless transmission 1 can obtain the similar operation and advantage as those of the embodiment.

In contrast, in the stepless transmission 1, the area of the contact ellipse of the contact section P1 can be made more smaller than the area of the contact ellipse of the contact section P2 and further the contact pressure of the contact ellipse of the contact section P1 can be made more larger than the contact pressure of the contact ellipse of the contact section P2 in comparison with those of the embodiment depending on how the hardness is set. Because of the reason, in the contact section P1, even if the axial forces of the axial force generators 71, 72 are more reduced in comparison with those of the embodiment, the contact pressure of the contact ellipse which is necessary to generate the target value of the traction force Ft can be secured. Further, in the contact section P1, it is possible to more reduce the spin loss due to the further reduction of the area of the contact ellipse while securing the contact pressure of the contact ellipse in comparison with that of the embodiment. In addition to the above-mentioned, in the contact section P2, the contact pressure of the contact ellipse which may become excessive can be more reduced by more reducing the axial forces of the axial force generators 71, 72 in comparison with the that of the embodiment. Thus, in the contact section P2, it is possible to more improve the durability of the second rotating body 20 and the planetary ball 50 while generating the target value of the traction force Ft in comparison with that of the embodiment.

Further, since, in the stepless transmission 1, the Young's moduli of the contact section P1 and the additional contact section in contact with the first rotating body 10 in the planetary ball 50 are made larger as the radius of the ring formed of the contact section P1 and the additional contact section becomes smaller, the reduction of the ratio γ at the speed-up side gear ratio makes the area of the contact ellipse of the contact section P1 gradually smaller than the area of the contact ellipse of the contact section P2 and further makes the contact pressure of the contact ellipse of the contact section P1 gradually higher than the contact pressure of the contact ellipse of the contact section P2. Accordingly, the stepless transmission 1 can reduce the spin loss while securing the contact pressure of the contact ellipse according to the gear ratio γ in the contact section P1. The contact pressure of the contact ellipse according to the gear ratio γ means the contact pressure of the contact ellipse of each gear ratio γ that is necessary to generate the target value of the traction force Ft.

In contrast, in the vehicle that uses the speed-down side gear ratio often, the Young's moduli of the contact section P2 and the additional contact section in contact with the planetary ball 50 in the second rotating body 20 is made larger than the Young's moduli of the contact section P1 and the additional contact section in contact with the planetary ball 50 in the first rotating body 10 and further the Young's moduli of the contact section P2 and the additional contact section in contact with the second rotating body 20 in the planetary ball 50 is made larger than the Young's moduli of the contact section P1 and the additional contact section in contact with the first rotating body 10. In the planetary ball 50, the more reduction of the radius of the ring formed by the contact section P2 and the additional contact section more increases the Young's moduli of the contact section P2 and the additional contact section in contact with the second rotating body 20. The reduction of the radius of the ring in that case means a direction from the center side of the planetary ball 50 in the axial direction of the second rotation center axis R2 to the rotating disk section 42 side.

In that case, the Young's modulus of the material or the surface treatment of the contact section P2 and the additional contact section of the planetary ball 50 in contact with at least the second rotating body 20 is made larger than the Young's moduli of the contact section P1 and the additional contact section in contact with the first rotating body 10, and the Young's modulus of the material or the surface treatment of the contact section P2 and the additional contact section in contact with the second rotating body 20 is made larger as the radius of the ring formed by the contact section P2 and the additional contact section becomes smaller. It is sufficient to apply the material and the surface treatment in the same manner as those explained in the vehicle that uses the speed-up side gear ratio often.

In the stepless transmission 1 in that case, the area of the contact ellipse of the contact section P2 can be made smaller than the area of the contact ellipse of the contact section P1 and further the contact pressure of the contact ellipse of the contact section P2 can be made higher than the contact pressure of the contact ellipse of the contact section P1 to the same level as those of the embodiment depending on how the hardness of the respective contact sections P2 and the additional contact section in the second rotating body 20 is in contact with the planetary ball 50 is set. Accordingly, the stepless transmission 1 can obtain the similar operation and advantage as those of the embodiment.

In contrast, in the stepless transmission 1, the area of the contact ellipse of the contact section P2 can be made more smaller than the area of the contact ellipse of the contact section P1 and further the contact pressure of the contact ellipse of the contact section P2 can be made more higher than the contact pressure of the contact ellipse of the contact section P1 in comparison with those of the embodiment depending on how the hardness is set. Because of the reason, in the contact section P2, even if the axial forces of the axial force generators 71, 72 are more reduced in comparison with those of the embodiment, the contact pressure of the contact ellipse which is necessary to generate the target value of the traction force Ft can be secured. Further, in the contact section P2, it is possible to more reduce the spin loss due to the further reduction of the area of the contact ellipse while securing the contact pressure of the contact ellipse in comparison with that of the embodiment. In addition to the above-mentioned, in the contact section P1, the contact pressure of the contact ellipse which may become excessive can be more reduced by more reducing the axial forces of the axial force generators 71, 72 in comparison with the that of the embodiment. Thus, in the contact section P1, it is possible to more improve the durability of the first rotating body 10 and the planetary ball 50 while generating the target value of the traction force Ft in comparison with that of the embodiment.

Further, since, in the stepless transmission 1, the Young's moduli of the contact section P2 and the additional contact section in contact with the second rotating body 20 in the planetary ball 50 are made larger as the radius of the ring formed by the contact section P2 and the additional contact section becomes smaller, the increase of the gear ratio γ at the speed-down side gear ratio makes the area of the contact ellipse of the contact section P2 gradually smaller than the area of the contact ellipse of the contact section P1 and further makes the contact pressure of the contact ellipse of the contact section P2 gradually larger than the contact pressure of the contact ellipse of the contact section P1. Accordingly, the stepless transmission 1 can reduce the spin loss while securing the contact pressure of the contact ellipse according to the gear ratio γ in the contact section P2.

As described above, the stepless transmission 1 of the modification has such a simple structure that the Young's moduli of the contact section P1 (P2) and the additional contact section in contact with the planetary ball 50 in one of the first and second rotating bodies 10, 20 is made larger than the contact section P2 (P1) and the additional contact section in contact with the planetary ball 50 of the other of the first and second rotating bodies 10, 20 and further the Young's moduli of the contact section P1 and the additional contact section in contact with the first rotating body 10 on one hand (the contact section P2 and the additional contact section in contact with the second rotating body 20) in the planetary ball 50 is made larger than the contact section P2 and the additional contact section in contact with the second rotating body 20 on the other hand (the contact section P1 and the additional contact section in contact with the first rotating body 10). Accordingly, since the stepless transmission 1 need not apply the surface treatment, etc. to any location of the first and second rotating bodies 10, 20 and the planetary ball 50 according to the contact sections P1, P2, the stepless transmission 1 can improve the durability while suppressing an increase of cost and securing the performance as the traction drive. Further, since the stepless transmission 1 increases the Young's moduli of the contact section P1, etc. in contact with the first rotating body 10 on the one hand in the planetary ball 50 (the contact section P2, etc. in contact with the second rotating body 20) as the radius of the ring formed by the contact section P1, etc. (the contact section P2, etc.) becomes smaller, the contact pressure of the contact ellipse according to the gear ratio γ can be secured in the contact section P1 (the contact section P2).

Incidentally, the stepless transmission 1 of the embodiment and the modification described above disposes the input shaft 11 and the output shaft 21 together on the torque input side where the first rotating body 10, etc. are disposed. However, the technology as to the change of the Young's modus explained in the embodiment, etc. may be applied to a stepless transmission in which the input shaft 11 and the output shaft 21 are disposed together to the torque output side where the second rotating body 20, etc. are disposed and further applied to a stepless transmission in which the input shaft 11 is disposed to the torque input side and the output shaft 21 is disposed to the torque output side. Also in these cases, the stepless transmissions can obtain the similar operation and advantage as those of the embodiment, etc.

REFERENCE SIGNS LIST 1 stepless transmission
10 first rotating body (first power transmission element)
10a inner circumferential surface
12a main member
12b ring member
13a main member
13b ring member
20 second rotating body (second power transmission element)
20a inner circumferential surface
30 sun roller (third power transmission element)
40 carrier (fourth power transmission element, fixed element)
44, 45 radial direction guide section
46 tilt force application unit
50 planetary ball (rolling body)
51 support shaft
52a main member
52b ring member
53a output side member
53b input side member
60 shaft (transmission shaft)
71, 72 axial force generator
P1, P2 contact section
R1 first rotation center axis
R2 second rotation center axis

The invention claimed is:

1. A stepless transmission comprising:
a transmission shaft acting as a center of rotation;
first to fourth power transmission elements having a first rotation center axis concentrically with the transmission shaft and being relatively rotatable in a circumferential direction mutually;
a plurality of rolling bodies having a second rotation center axis, disposed radially about the first rotation center axis on an outer circumferential surface of the third power transmission element, clamped by the first and second power transmission elements disposed in confrontation with each other, and tiltably held by the fourth power transmission element;
an axial force generator configured to generate axial force in an axial direction to press at least one of the first and second power transmission elements against the rolling bodies; and
a transmission configured to change a gear ratio between an input and output by tilting the rolling bodies, wherein
Young's moduli of a contact section and an additional contact section, in contact with the rolling body, of one of the first and second power transmission elements are larger than Young's moduli of a contact section and an additional contact section, in contact with the rolling body, of other one of the first and second power transmission elements, and wherein
Young's moduli of a contact section and an additional contact section, in contact with the one of the first and second power transmission elements, of the rolling bodies are larger than Young's moduli of a contact section and an additional contact section in contact with the other one of the first and second power transmission elements, and the Young's moduli of the contact section and the additional contact section in contact with the one of the first and second power transmission elements become larger as a radius of a ring formed by the contact section and the additional contact section becomes smaller.

2. The stepless transmission according to claim 1, wherein a Young's modulus of a material or a surface treatment of at least the contact section and the additional contact section of the one of the first and second power transmission elements is larger than the Young's modulus of the contact section and the additional contact section of the other one of the first and second power transmission elements.

3. The stepless transmission according to claim 1, wherein the one of the first and second power transmission elements comprises at least two members, and a Young's modulus of one member including the contact section and the additional contact section is larger than a Young's modulus of another member.

4. The stepless transmission according to claim 1, wherein the one of the first and second power transmission elements is coupled with a power input shaft and the other one of the first and second power transmission elements is coupled with a power output shaft.

5. The stepless transmission according to claim 1, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

6. The stepless transmission according to claim 2, wherein the one of the first and second power transmission elements is coupled with a power input shaft and the other one of the first and second power transmission elements is coupled with a power output shaft.

7. The stepless transmission according to claim 2, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

8. The stepless transmission according to claim 3, wherein the one of the first and second power transmission elements is coupled with a power input shaft and the other one of the first and second power transmission elements is coupled with a power output shaft.

9. The stepless transmission according to claim 3, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

10. The stepless transmission according to claim 4, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

11. The stepless transmission according to claim 6, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

12. The stepless transmission according to claim 8, wherein a Young's modulus of at least a material or a surface treatment of the contact section and the additional contact section, in contact with the one of the first and second power transmission elements, of the rolling bodies are larger than the Young's moduli of the contact section and the additional contact section in contact with the other one of the first and second power transmission elements, and the Young's modulus of the material or surface treatment of the contact section and the additional contact section in contact with the one of the first and second power transmission elements become larger as the radius of the ring formed by the contact section and the additional contact section becomes smaller.

* * * * *